United States Patent Office 3,539,544
Patented Nov. 10, 1970

3,539,544
POLYMERIZATION OF VINYL CHLORIDE
Michel Marbach, Lyon, and Jacques Brivet, Bron, France, assignors to Produits Chimiques Pechiney-Saint-Gobain, Neuilly sur Seine, France
No Drawing. Filed Oct. 22, 1968, Ser. No. 769,714
Claims priority, application France, Oct. 24, 1967, 125,633; Apr. 25, 1968, 149,436
Int. Cl. C08f *3/30, 15/08*
U.S. Cl. 260—85.5                    9 Claims

ABSTRACT OF THE DISCLOSURE

This polyvinyl chloride polymerization proceeds between −20° and 65° C. in mass or in precipitating medium in admixture with a catalytic system which contains the diacyl peroxide and a reducing agent being a titanium mineral compound in a state of oxidation such that it will reduce the diacyl peroxide, for instance a titanium halide of which the bromide, chloride, and fluoride are exemplary. This reducing agent is advantageously added to the reaction mass in solution in an alcohol, e.g. methanol, ethanol, isopropanol, butanol. The diacyl peroxide has the formula $$R-\underset{\underset{O}{\|}}{C}-O-O-\underset{\underset{O}{\|}}{C}-R$$

R being alkyl or aryl.

---

This invention relates to the manufacture of polymers of vinyl chloride, including the homopolymers and the copolymers thereof with compatible monomers of other classes. It deals principally with initiators (catalysts) for the polymerization, with the operating conditions of the process, and with the products.

It will be remembered that there are, generally speaking, two kinds of process and polymer, higher temperature and lower temperature, the first process taking place circa 60° C. and the other below about 20° C. It will also be remembered that vinyl chloride can be polymerized in several ways, in mass, in solution, in suspension, in emulsion. This invention relates to polymerization in mass (also called in bulk) or in a medium which precipitates the polymer, the polymer being insoluble in the medium. The invention has the advantage of being operable at a wide range of temperatures, differing in this aspect from many former processes which were operable with success only at low or at high temperature.

It has already been proposed to effect the polymerization of vinyl chloride in mass in the presence of diacyl peroxides such as lauroyl peroxide or benzoyl peroxide as initiators, which could prepare only polymers (including copolymers) of medium molecular weight because a high temperature was required to decompose them, 55°–70°. being necessary for lauroyl peroxide.

It is an object of the invention to produce polymers of higher molecular weight than was previously possible from diacyl peroxides, using temperature ranges lower than were previously available with such catalysts.

These objects have been attained by incorporating in the reaction mass a reducing agent for the diacyl catalyst. In this way lower temperatures of polymerization become useful, the polymers are of improved properties compared to those previously produced, being in these respects of greater resistance to traction, of improved temperatures of bending and softening, and having better resistance to solvents such as di- or trichloroethylene.

The objects are attained by a method of forming polymers and copolymers of vinyl chloride with or without a compatible comonomer, both insoluble in such reaction medium as may be present, which comprises polymerizing such monomer in admixture with a catalytic system comprising a diacyl peroxide of the formula $$R-\underset{\underset{O}{\|}}{C}-O-O-\underset{\underset{O}{\|}}{C}-R$$

in which R is alkyl or aryl, and a titanium mineral compound in a state of oxidation such that it will reduce the diacyl peroxide, for instance a titanium halide of which the bromide, chloride, and fluoride are exemplary. This reducing agent is advantageously added to the reaction mass in solution in an alcohol, e.g. methanol, ethanol, isopropanol, butanol.

The polymerization proceeds in mass or in precipitating medium between −20° and +50° C., and preferably between −15° and +30° C. when R is alkyl; between −15 and +65° C., and preferably between −5 and +30° C. when R is aryl.

Among the useful diacyls are caproyl peroxide, butyroyl peroxide, propionyl peroxide, capryl peroxide, valeryl peroxide, heptanoyl peroxide, pelargonyl peroxide, undecanoyl peroxide, lauroyl peroxide, benzoyl peroxide, para-tertiobutyl-benzoyl peroxide. The proportion by weight of diacyl to monomer may be .005 to .2%.

Among the preferred reducing agents for the diacyls are the titanium halides, especially the trichloride, tribromide, or trifluoride.

The system is applicable to mixed monomers of which the compatible comonomers may be from the classes represented by styrene, dichloroethylene 1-1, acrylonitrile, acrylamide, vinyl esters (e.g. laurate, stearate, acetate), acrylates, methylacrylates.

For efficient action the proportion by weight of diacyl to monomer may be .001 to .1%, and the reducing agent, when titanium halide, may be from ⅕ mole to 5 moles per mole of diacyl.

The reaction proceeds by oxyreduction in which the reducing agent plays the role of activator of the dismemberment of the diacyl by the reaction $$R-\underset{\underset{O}{\|}}{C}-O-O-\underset{\underset{O}{\|}}{C}-R + TiCl_3 \longrightarrow R-\underset{\underset{O}{\|}}{C}-O + R-\underset{\underset{O}{\|}}{C}-O-TiCl$$

The quantity of monomer present being superior to the reducing agent, the radical $$R-\underset{\underset{O}{\|}}{C}-O$$

initiates a chain reaction with the monomer, as follows:

$$R-\underset{\underset{O}{\|}}{C}-O- + M \longrightarrow R-\underset{\underset{O}{\|}}{C}-O-M$$

$$R-\underset{\underset{O}{\|}}{C}-O-M + M \longrightarrow R-\underset{\underset{O}{\|}}{C}-O-M_2$$

$$R-\underset{\underset{O}{\|}}{C}-O-M_{n-1} + M \longrightarrow R-\underset{\underset{O}{\|}}{C}-O-M_n$$

which arrests itself by inactivation of both radicals or by reaction with a new mole of $TiCl_3$, which goes thus $$R-\underset{\underset{O}{\|}}{C}-O-M_n + TiCl_3 \longrightarrow R-\underset{\underset{O}{\|}}{C}-O-M_n-TiCl_3$$

This reaction is the more probable as the quantity of reducing agent is the greater in the reaction medium. This explains a phenomenon observed by the inventors that the greater the proportion of reducing agent to diacyl increases the less is the mean molecular weight of the product.

This catalytic system is useful not only in the processes above described but in the systems recited in French Pats. 1,079,772; 1,257,780; 1,357,736; 1,382,072; 1,436,744; 1,436,464; 1,493,610; and 1,505,390 and it may be assumed that it is valid for all systems involving vinyl chloride, all systems involving vinyl chloride and its comonomers the polymers of which are insoluble in or precipitated from the reaction medium, and all of such comonomers alone.

The products of the method are polymers which have a high proportion of syndiotactic molecules, which improves their physical and chemical properties and particularly their resistance to benzenic solvents.

The following examples illustrate the invention without detracting from the generalities elsewhere herein stated:

EXAMPLE 1

A 1 liter glass lined autoclave provided with a water jacket and a stainless steel agitator received 1.5 g. of lauroyl peroxide, 400 g. vinyl chloride, and was scavenged by air by releasing 100 g. vinyl chloride. The temperature was brought to 0° C. by appropriate flow of fluid through the jacket. The remaining peroxide provided a concentration of .02% active oxygen. 180 mg. of $TiCl_3$ ($Ti^{3+}$) was dissolved in 16 g. methanol and introduced. After six hours 82 g. of polymer were recovered, corresponding to 27.3% transformation. The autoclave being of fixed dimensions the process was at constant volume The product was of higher molecular weight and had better resistance to solvents than the similar polymer prepared without the reducing agent.

EXAMPLE 2

The apparatus of Example 1 received 3 g. of lauroyl peroxide, and 400 g. of vinyl chloride, was purged by release of 100 g. of vinyl chloride, and accepted 360 mg. of $Ti^{3+}$ as a solution of $TiCl_3$ in 20 g. methanol (.04% active oxygen). After three hours at 0° C. the yield was 176 g. of polymer or 40% transformation. It had an index of viscosity AFNOR of 201, a Fikentscher K index of 85.5 and a VICAT softening point of 89° C. (ASTM D1525-65T).

EXAMPLE 3

An apparatus similar to Example 1 but provided with a magnetic agitator received successively 1.19 g. benzoyl peroxide (.060 g. active oxygen) and 400 g. vinyl chloride. After venting 100 g. of the vinyl chloride to purge the autoclave the temperature was adjusted at −15° C. and 580 mg. of $TiCl_3$ in 15 g. methanol were added. After 7 hours of polymerization 11.7 g. of polymer were recovered, a transformation of 3.9%.

EXAMPLE 4

The operation of Example 3 was repeated at 0° C. instead of −15° C. and the yield was 64.3 g. or 21.4%. The viscosity index was of 150, the K index of 74.5 and the Vicat point of 87.5° C.

EXAMPLE 5

The operation of Example 3 was repeated at +15° C. instead of −15° C. and the yield was 46.4 g. of resin or 15.4%.

EXAMPLE 6

The autoclave of Example 3 received 1.19 g. benzoyl peroxide (.060 g. active oxygen), 400 g. vinyl chloride of which 100 g. were vented to purge the autoclave, the temperature was set at 0° C. and 580 mg. $TiCl_3$ in 30 g. of methanol were added. After 3 hours of polymerization 54 g. of polymer were recovered, a yield of 18%.

EXAMPLE 7

The autoclave of Example 3 received 1.36 g. paratertiobutyl-benzoyl peroxide (.060 g. active oxygen) and 400 g. vinyl chloride, the autoclave was purged with 100 g. vinyl chloride, the temperature was put at −15° C., and 580 mg. $TiCl_3$ in 15 g. methanol were added. After 7 hours polymerization the yield was 18 g. (6%).

EXAMPLE 8

The operation of Example 7 was repeated but at 0° C. instead of −15° C. The yield was 66 g. or 22%. The viscosity index was of 154, the K index of 75, the Vicat point of 88° C.

EXAMPLE 9

The operation of Example 7 was repeated but at +15° C. The yield was 3% or 9 g.

EXAMPLE 10

The autoclave of Example 3 received 1.78 ml. of a solution of acetyl peroxide in methyl phthalate (.06 g. active oxygen, 400 g. vinyl chloride, was purged by 100 g. vinyl chloride, temperature set at −15° C., and 580 mg. of $TiCl_3$ in 15 g. methanol were added. After 3 hours' polymerization the yield was 40 g. or 13.3%.

EXAMPLE 11

The apparatus of Example 3 received 1.11 g. caprylyl peroxide containing .06 g. active oxygen, 400 g. vinyl chloride, was purged alike, and set at −15° C. 580 mg. $TiCl_3$ in 15 g. methanol were added and after 3 hours 45 g. of polymer, or 15%, were recovered.

EXAMPLE 12

The apparatus of Example 3 received 1.75 ml. of trimethyl 2,2,4-hexanoyl peroxide in dimethyl phthalate (.06% active oxygen), 400 g. vinyl chloride, was purged by release of 100 g. vinyl chloride, adjusted to −15° C., and accepted 580 mg. of $TiCl_3$ dissolved in 15 g. of methanol. After 3 hours 39 g. of polymer were recovered, corresponding to a transformation of 13%.

EXAMPLE 13

In that example, the polymerization is carried out in presence of a great quantity of isopropanol (precipitating medium), in which $TiCl_3$ is less soluble than in methanol.

The apparatus of Example 1 received 1.5 g. of lauroyl peroxide (60 mg. active oxygen), 400 g. vinyl chloride, was purged by release of 100 g. vinyl chloride, adjusted to −15° C. and accepted 600 mg. of $TiCl_3$ (30% $Ti^{3+}$) dissolved in 75 g. isopropanol.

After 3 hours, 84 g. of polymer were recovered, corresponding to a transformation of 24%. The viscosity index was of 170, the K index of 81 and the Vicat point of 96° C.

The advantages are in lowering the operating temperature, producing polymers of higher molecular weight, in an improved class of products.

As many apparently widely different embodiments of the present invention may be made without departing from the spirit and scope thereof, it is to be understood that the invention is not limited to the specific embodiments.

What is claimed is:

1. A method of forming polymers having a base of vinyl chloride, which comprises polymerizing a monomer composition comprising preponderantly vinyl chloride in admixture with a catalytic system comprising a diacyl peroxide which supplies active oxygen, of the formula

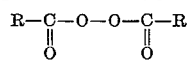

in which R is a radical selected from the group consisting of alkyl radicals having up to 11 carbon atoms and aryl radicals, and a titanium trihalide in a state of oxidation such that it will reduce the diacyl peroxide, at a temperature between −20° C. and +65° C., in which the diacyl peroxide is present in amount which supplies from 0.0005% to 0.2% by weight of the monomer of said active oxygen, and said titanium trihalide is present in an amount constituting from ⅓ mole to 5 moles per mole of said diacyl peroxide.

2. The method according to claim 1 in which R is alkyl and the temperature of polymerization is between −15° C. and +30° C.

3. The method of claim 1 in which R is alkyl and the temperature is between −20° C. and about +50° C.

4. The method of claim 1 in which R is aryl and the temperature is between −15° C. and about +65° C.

5. The method of claim 1 in which R is aryl and the temperature is between about −5° C. and about +30° C.

6. The method of claim 1 in which the diacyl peroxide is selected from the class consisting of caproyl peroxide, butyroyl peroxide, propionyl peroxide, caprylyl peroxide, valeryl peroxide, heptanoyl peroxide, pelargonyl peroxide, undecanoyl peroxide, lauroyl peroxide, benzoyl peroxide, and para-tertiabutyl-benzoyl peroxide.

7. The method of claim 1 in which a comonomer selected from the group consisting of acrylates, methacrylates, 1,1 dichloroethylene, styrene, acrylonitrile, acrylamide, and vinyl esters is included with the monomer composition.

8. The method of claim 1 in which the polymerization is in mass.

9. The method of claim 1 in which the reaction mass includes an inert medium miscible with the monomers but in which the polymeric product is insoluble.

References Cited

UNITED STATES PATENTS

| | | | |
|---|---|---|---|
| 2,344,785 | 3/1944 | Owens et al. | 260—92.8 |
| 2,380,476 | 7/1945 | Stewart. | |

HARRY WONG, Jr., Primary Examiner

U.S. Cl. X.R.

252—429; 260—86.3, 87.1, 87.5, 92.8